United States Patent [19]
Flournoy et al.

[11] 3,811,507
[45] May 21, 1974

[54] SURFACTANT OIL RECOVERY PROCESS USABLE IN FORMATIONS CONTAINING WATER HAVING HIGH CONCENTRATION OF POLYVALENT IONS SUCH AS CALCIUM AND MAGNESIUM

[75] Inventors: Kenoth H. Flournoy; Russell D. Shupe, both of Houston, Tex.

[73] Assignee: Texaco Inc., New York, N.Y.

[22] Filed: Mar. 5, 1973

[21] Appl. No.: 338,117

[52] U.S. Cl. .............................. 166/274, 166/273
[51] Int. Cl. .......................................... E21b 43/22
[58] Field of Search .......................... 166/273–275; 252/8.55 D

[56] References Cited
UNITED STATES PATENTS

| | | | |
|---|---|---|---|
| 3,508,612 | 4/1970 | Reisberg et al. | 166/275 X |
| 3,638,728 | 2/1972 | Hill | 166/273 |
| 3,768,560 | 10/1973 | Hill et al. | 166/273 X |
| 3,437,141 | 4/1969 | Brandner et al. | 166/273 |
| 3,469,630 | 9/1969 | Hurd et al. | 166/273 X |
| 3,434,542 | 3/1969 | Dotson et al. | 166/273 |

Primary Examiner—Stephen J. Novosad
Attorney, Agent, or Firm—T. H. Whaley; C. G. Reis

[57] ABSTRACT

A two component surfactant system usable in the presence of from about 3,000 to about 18,000 parts per million polyvalent ions, including calcium and or magnesium, and a method of using said dual surfactant system for recovering petroleum from subterranean formations, said surfactant system comprising a water soluble salt of a linear alkyl or a linear alkylaryl sulfonate first anionic surfactant plus a water soluble salt of an alkyl polyethoxy sulfate second anionic surfactant.

22 Claims, 7 Drawing Figures

CORE DISPLACEMENT TESTS
WATER FLOOD AND SURFACTANT FLOOD

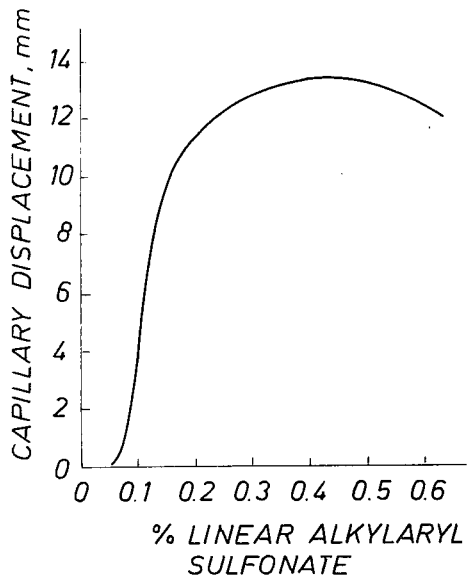
FIG.4
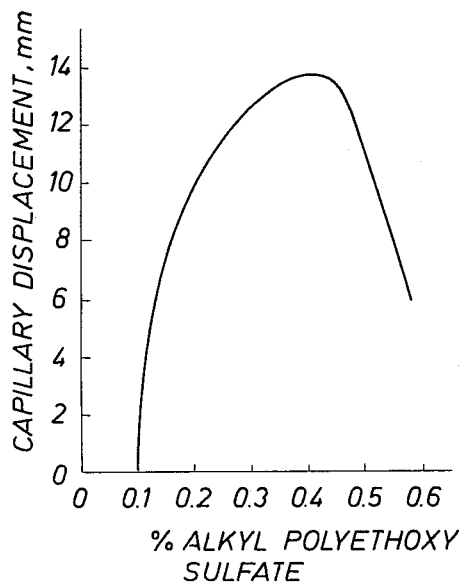
FIG.5
FIG.6
FIG.7
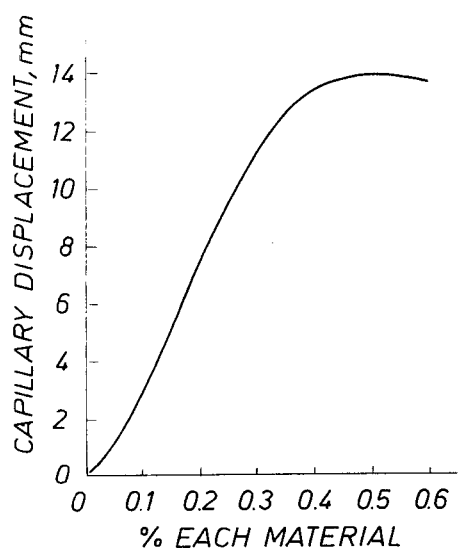
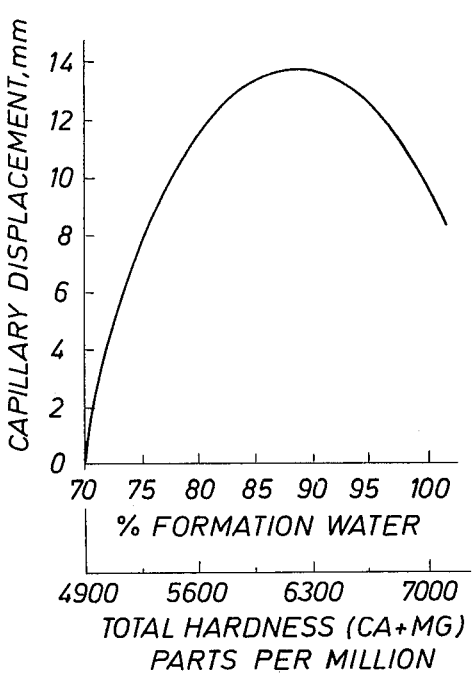

SURFACTANT OIL RECOVERY PROCESS USABLE IN FORMATIONS CONTAINING WATER HAVING HIGH CONCENTRATION OF POLYVALENT IONS SUCH AS CALCIUM AND MAGNESIUM

BACKGROUND OF THE INVENTION

1. Field of the Invention

This invention relates to a method for recovering petroleum from subterranean, petroleum containing formations, and more particularly to a surfactant flooding method for recovering petroleum from petroleum containing formations. Still more particularly, this invention pertains to an oil recovery method employing a two component surfactant mixture which will function effectively in the presence of formation water containing high polyvalent ion concentrations, e.g., calcium or magnesium concentrations of from 3,000 – 18,000 parts per million, which cause precipitation of conventional surfactants.

2. Description of the Prior Art

Petroleum is normally recovered from subterranean formations in which it has accumulated by penetrating said formation with one or more wells and pumping or permitting the petroleum to flow to the surface through these wells. Recovery of petroleum from petroleum containing formations is possible only if certain conditions are satisfied. There must be an adequate concentration of petroleum in the formation, and there must be sufficient porosity and permeability of interconnected flow channel throughout the formation to permit the flow of fluids therethrough if sufficient pressure is applied to the fluid. When the subterranean petroleum containing formation has natural energy present in the form of an underlying active water drive, of gas dissolved in the petroleum which can exert sufficient pressure to drive the petroleum to the producing well, or a high pressure gas cap above the petroleum within the petroleum reservoir, this natural energy is utilized to recover petroleum. Recovery of petroleum by utilization of natural energy is referred to as primary recovery. When this natural energy source is depleted, or in the instance of those formations which do not originally contain sufficient natural energy to permit primary recovery operations, some form of supplemental recovery process must be utilized in order to extract petroleum from the subterranean petroleum containing formation. Supplemental recovery is frequently referred to as secondary recovery, although in fact it may be primary, secondary or tertiary in sequence of employment.

Water flooding, which involves the injection of water into the subterranean, petroliferous formation for the purpose of displacing petroleum toward the producing well, is the most economical and widely practiced supplemental recovery method. Water does not displace petroleum with high efficiency, however, since water and oil are immiscible, and also because the interfacial tension between water and oil is quite high. Persons skilled in the art of oil recovery have recognized this weakness of water flooding and many additives have been described in the prior art for decreasing the interfacial tension between the injected water and the formation petroleum. For example, U. S. Pat. No. 2,233,381 (1941) disclosed the use of polyglycol ether as a surface active agent or surfactant to increase the capillary displacement efficiency of an aqueous flooding medium. U.S. Pat. No. 3,302,713 discloses the use of petroleum sulfonate prepared from the 850° to 1,050° F. boiling range fraction of petroleum crude as a surfactant for use in oil recovery operations. U.S. Pat. No. 3,468,377 (1969) describes the use of petroleum sulfonates of a specified molecular weight for oil recovery. Other surfactants which have been proposed for oil recovery include alkylpyridinium salts, alkyl sulfates, alkyl sulfonates, and quaternary ammonium salts.

The above described surfactants are satisfactory for surfactant flooding in petroliferous formations only if the calcium and magnesium concentration of the formation water is below about 500 parts per million. Petroleum sulfonate is one of the most popular and desirable surfactants because of its high surface activity and low unit cost, although it also suffers from the limitation that it can be used only when the total formation water hardness (calcium + magnesium) is less than about 500 parts per million. If the formation water calcium and/or magnesium content exceeds about 500 parts per million, petroleum sulfonates precipitate rapidly. When precipitation of the added material occurs, not only is the desired beneficial result lost, but plugging of the formation will very likely result.

Many subterranean petroleum containing formations are known to exist which contain polyvalent ions such as magnesium and calcium in concentrations substantially in excess of 500 parts per million. The most common of such reservoirs are limestone formations which may have polyvalent ion concentrations from 1,000 to as high as 20,000 parts per million in the original connate water, and the formation water after a limestone formation has been subjected to flooding with relatively fresh water may have concentrations of calcium and/or magnesium from about 500 to about 18,000 parts per million. Since surfactants usable for oil recovery operations precipitate when exposed to aqueous environments having a total hardness in excess of about 500 parts per million, such sulfactants could not be used in limestone reservoirs. If an aqueous solution of petroleum sulfonate, for example, is injected into a limestone reservoir, petroleum sulfonate precipitates immediately on contacting the high calcium containing formation water. In such a process, the flood water would have essentially no surfactant present in it to decrease the interfacial tension between water and petroleum. Furthermore, precipitated petroleum sulfonate plugs the small flow channels in the subterranean petroleum containing formation, decreasing the formation porosity and injectivity, thereby causing a substantial decrease in the oil displacement efficiency.

In U. S. Pat. No. 3,508,612, J. Reisberg et al., 1970, an oil recovery method employing a mixture of petroleum sulfonate and sulfated ethoxylated alcohol is disclosed which results in improved oil recovery in the presence of high concentrations of polyvalent ions including calcium. Field application of petroleum sulfonate has revealed numerous problems associated with the heterogeneous nature of the oleophilic moieties present. Specifically in a paper presented at the Society of Petroleum Engineers, Fall 1972, meeting held in San Antonio, the problem of fractionation of the petroleum sulfonate surfactant was noted. The paper, SPE 4084, is titled "Borregas Surfactant Pilot Test" by Messrs. S. A. Pursley and H. L. Graham. In the paper it is stated that "The higher equivalent weight materiials were selectively absorbed on the mineral surfaces of the rock" and the higher equivalent weight portions of the [petroleum sulfonate] surfactant are the prime contributors to low interfacial tensions that permit mobilization of residual oil." Thus a unique problem is recognized in the use of petroleum sulfonate in that the most effective portions of petroleum sulfonate are selectively removed from aqueous solution by absorption on the rock surface and/or partitioning into the oil phase.

Nonionic surfactants, such as polyethoxylated alkylphenols, polyethoxylated aliphatic alcohols, carboxylic esters, carboxylic amides, and polyoxyethylene fatty acid amides, have a somewhat higher tolerance of polyvalent ions such as calcium or magnesium than do the more commonly utilized anionic surfactants. While it is technically feasible to employ a nonionic surfactant solution to decrease the interfacial tension between the injected aqueous displacing medium and petroleum contained in some limestone formations, such use would not be economically feasible for several reasons. Nonionic surfactants are not as effective on a unit weight basis as are the more commonly used anionic surfactants, and furthermore, the nonionic surfactants have a higher cost per unit weight than do the anionic surfactants.

Thus it can be seen that while many surfactants have been proposed for supplemental oil recovery use, there is a substantial, unfulfilled need for an oil recovery method employing a surfactant composition unaffected by selective adsorption fractionation in the formation and usable in the presence of formation waters containing calcium and/or magnesium substantially in excess of 500 parts per million.

SUMMARY OF THE INVENTION

This invention pertains to a novel oil recovery method using a two component surfactant system usable in petroleum containing formations containing water having a polyvalent ion content, for example calcium and/or magnesium, in the range of about from 3,000 to about 18,000 parts per million. The surfactant system is comprised of an aqueous solution of about 0.05 to about 5.0 percent by weight of a first anionic surfactant such as a water soluble salt of linear alkyl or a linear alkylaryl sulfonate, for example sodium dodecylbenzene sulfonate, plus from about 0.05 to about 5.0 percent by weight of a water soluble salt of an alkyl polyethoxylated sulfate second anionic surfactant such as sodium dodecyl polyethoxy sulfate. From about 2 percent pore volume to about 50 percent pore volume of the aqueous dual surfactant solution is injected into the formation. The surfactant solution may be displaced through the formation by injecting water, or it may be followed immediately by a quantity of thickened water for mobility ratio control, which is in turn displaced through the formation with water. Our invention therefore incorporates the method of using the two component surfactant system for the recovery of petroleum from subterranean petroleum containing formations having a polyvalent ion concentration in the formation water from about 3,000 to about 18,000 parts per million.

BRIEF DESCRIPTION OF THE DRAWINGS

FIG. 4 illustrates the results of a series of capillary displacement tests using 0.4% sodium tridecylpolyethoxy sulfate in water containing 7,000 parts per million total hardness with the concentration of ammonium dodecylbenzene sulfonate varied from 0 to 0.6 percent by weight.

FIG. 5 illustrates the results of a series of capillary displacement tests using 0.4% ammonium linear dodecylbenzene sulfonate in water containing 7,000 parts per million total hardness with the concentration of sodium tridecylpolyethoxy sulfate varied from 0 to 0.6 percent.

FIG. 6 illustrates the results of a series of capillary displacement tests conducted in aqueous solution containing 7,000 parts per million total hardness with the concentration of each surfactant varied from 0 to 0.6%.

FIG. 7 illustrates the results of a series of capillary displacement tests using 0.4% of sodium tridecylpolyethoxy sulfate plus 0.4% ammonium dodecylbenzenesulfonate with the total polyvalent ion concentration varied from 4,900 to 7,000 parts per million.

DESCRIPTION OF THE PREFERRED EMBODIMENTS

Figure 1:
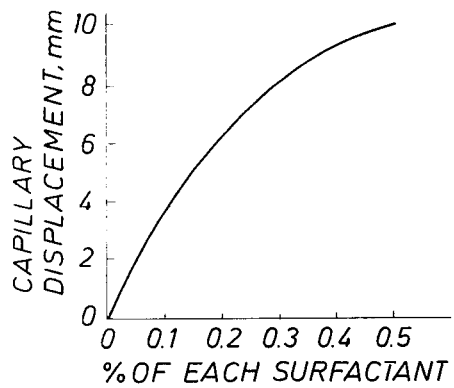
FIG. 1 illustrates the result of a series of capillary displacement test utilizing an aqueous solution having 12,000 parts per million total hardness with varying concentrations of each of the two surfactants used in this invention.

This invention concerns an oil recovery process employing a two component surfactant system which can be used in subterranean petroleum containing formations which also contain "hard water," or water having polyvalent ions such as calcium and/or magnesium dissolved therein in a concentration of from about 3,000 to about 18,000 parts per million. There are many petroleum containing formations which contain water having calcium and/or magnesium concentrations in the range from about 3,000 to about 18,000 parts per million, the most common of such formations being limestone formations. These formations frequently contain a substantial amount of petroleum after primary production and after water flooding, but conventional surfactant flooding cannot be employed in them because surfactants previously proposed for oil recovery are insoluble or otherwise ineffective in the presence of calcium and/or magnesium in the range of from 3,000 to 18,000 parts per million.

We have found that a aqueous solution of two surfactant materials, in a critical concentration range, will effectively reduce the surface tension between oil and water, and will function effectively in the presence of calcium and magnesium in a concentration of from about 3,000 to about 18,000 parts per million total hardness. The two surfactant system comprises 1. A first anionic surfactant having one of the following general formulas:

(a) $R - SO_3^- - Y^+$ (linear alkyl sulfonate)

wherein R is a linear alkyl radical, having from 5 to 25 and preferably from 8 to 14 carbon atoms, and Y is a monovalent cation such as sodium, potassium or ammonium, or (b) 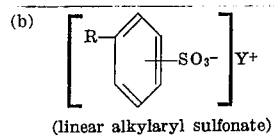

(linear alkylaryl sulfonate)

wherein R and Y have the same meaning as above. For example, if R is linear dodecyl and Y is ammonium, the material is ammonium linear dodecylbenzene sulfonate.

2. A second anionic surfactant having the following general formula:

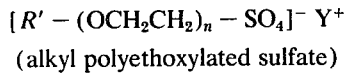

(alkyl polyethoxylated sulfate)

wherein $R'$ is an alkyl radical, linear or branched, having from 7 to 20 carbon atoms, n is an integer from 1 to 10 and Y is a monovalent cation such as sodium, potassium or ammonium. For example sodium tridecylpolyethoxy sulfate is a preferred material for use as the second anionic surfactant of our invention.

The term surfactant encompasses a broad spectrum of materials which share the following common characteristics:

1. The material must be at least slightly soluble in at least one phase of a liquid system,
2. The material must have an amphipathic structure (the molecule is composed of groups with opposing solubility tendencies). For use in supplemental oil recovery operations, and the molecule must have at least one hydrophobic or oil soluble group and at least one hydrophilic or water soluble group.
3. The surfactant molecules or ions must form oriented monolayers at phase interfaces.
4. The equilibrium concentration of the surfactant in any particular solute at the phase interface is greater than the concentration of the surfactant in the bulk of the solution.
5. The material must tend to form micelles or aggregates of molecules or ions whenever the concentration exceeds a certain limiting value which is a characteristic of the particular surfactant and solute.
6. The material must exhibit some combination of the following functional properties: detergency, foaming, wetting, emulsifying, solubilizing and dispersing.

Surfactants are generally classified on the basis of the type of hydrophilic or water soluble group or groups attached to the molecule, generally being classified as anionic, cationic or nonionic, as described below more fully.

1. Anionic surfactants are those surfactant materials wherein the hydrophilic or water soluble group is a carboxylate, sulfonate, sulfate or phosphate group. This is the most important class of surfactants. Anionic surfactants are readily available, inexpensive, and have a high degree of surface activity. Petroleum recovery operations will generally involve the use of anionic surfactants unless there is some objection to the use of anionic surfactants, or some sufficient reason to resort to the use of some other compound. Petroleum sulfonates are popular anionic surfactants for oil recovery and are prepared by isolating a preselected boiling range fraction of a crude oil and subjecting it to sulfonation. Although this material is desirable for use because of its low unit cost, there are problems associated with the use of petroleum solfonates because of the complex nature of the hydrophobic or oil soluble portion of the molecule which results in selective adsorption-partition loss, as well as the limited tolerance for calcium and magnesium.

2. Cationic surfactants employ primary, secondary, or tertiary amine salts, or quaternary ammonium groups, as the hydrophilic or water soluble group.

3. Nonionic surfactants are materials which have no charge when the material is dissolved in an aqueous medium. The hydrophilic tendency is derived from oxygen atoms in the molecule which hydrate by hydrogen bonding to water molecules present in the solute. Nonionic surfactants are somewhat more efficient in the presence of high concentrations of calcium and magnesium than are either anionic or cationic surfactants, and it is possible to conduct a surfactant flood operation in a formation wherein the formation water contains substantial quantities of calcium and/or magnesium, above 500 parts per million, although they cannot tolerate calcium and/or magnesium levels of the upper part of the hardness range encountered in limestone formatins as described hereinabove. Nonionic surfactants are also not particularly desirable for use as the sole surfactant because of their high cost per unit weight and low surface activity.

The optimum concentration of each material which constitutes the surfactant system used in the process of our invention will vary to a degree depending on the hardness and other characteristics of the aqueous environment in which it is to be used. Ideally, this should be determined by test utilizing the actual formation water in which the material will be used. Generally from about 0.05 percent to about 5.0 percent and preferably from about 0.2 to about 0.5 percent by weight of the first anionic surfactant and from about 0.05 to about 5.0 percent and preferably from about 0.20 to 0.50 percent by weight of the second anionic surfactants will be effective within the 3,000 to 18,000 parts per million hardness range of the aqueous environment. The ratio of the first anionic surfactant to the second anionic surfactant can range from 4 to 1 to about 1 to 4, although it will generally be near 1:1. A larger amount of the first surfactant (the linear alkylaryl sulfonate) will be required in the 3,000–5,000 ppm hardness range, whereas more of the alkyl polyethoxy sulfate than alkylaryl sulfonate will be required in the formation water total hardness range of 14,000–18,000 parts per million. Ideally this should be determined precisely using the capillary displacement test described hereinafter.

In the practice of our invention, from about 2 to 50 pore volume percent of an aqueous solution containing from about 0.05 to about 5.0 and preferably from about 0.2 to about 0.5 percent by weight of the first anionic surfactant, specifically a linear alkyl or a linear alkylaryl sulfonate, plus from about 0.05 to about 5.0 and preferably from about 0.2 to about 0.5 percent by weight of the second anionic surfactant, the alkyl polyethoxylated sulfate, is injected into the subterranean petroleum containing formation. The subterranean petroleum containing formation to which this invention will be applied will ordinarily be a limestone formation, although any formation having water containing from about 3,000 to about 18,000 parts per million calcium and/or magnesium can effectively be exploited by means of the subject process. Ordinarily, water injection will have been applied to the reservoir first, although this is not a requirement for the employment of this invention. Water injection or water flooding is, however, a desirable first phase of the recovery program for several reasons. It is less expensive to conduct than the surfactant flooding program, and furthermore, the injection of relatively fresh water into a formation containing connate water having high concentrations of calcium and/or magnesium will result in the lowering of the water hardness to a point where it will be more feasible to find a surfactant system which will effectively reduce the interfacial tension between the formation water and petroleum. As will be seen later hereinafter in this specification, it is not necessarily to be expected that the optimum interfacial tension reduction will be achieved at the lowest possible total water hardness. This furnishes still another reason for the desirability that actual experimentation be undertaken utilizing the available formation water or a relatively close facsimile thereof, to select the best surfactants and concentrations thereof, and also the optimum hardness at which the chosen composition will function.

In applications of this process to petroleum formations wherein it is known or expected that at least one of the surfactants will be adsorbed from solution onto the formation rock, it is necessary either to use a preflush of sacrificial inorganic material such as a polyphosphate, or to use more than the optimum concentration of surfactant is determined by capillary tests or other means. It is generally satisfactory to use up to 5 percent by weight total surfactant, and this surplus material need only be added to the first 10 percent or so of the surfactant slug injected. Both surfactants may tend to be absorbed by the formation, or there may be a preferential absorption of either one of the anionic surfactants used, depending on the characteristics of the formation rock.

If the viscosity of the petroleum contained in the subterranean formation is sufficiently high the ratio of viscosities of injected fluid to displace fluid, or mobility ratio as it is referred to in the art of supplemental oil recovery, will result in an adverse sweep efficiency. In this case it will be necessary to utilize an additive to increase the viscosity of the injected aqueous fluid to more nearly match the viscosity of the subterranean petroleum. Hydrophilic polymers such as polyacrylamides or polysaccharides are effective for this purpose in concentrations from about 50 to about 2,000 parts per million in an aqueous solution. The use of this amount of polymer results in a fluid having an apparent viscosity of from about 5 to about 15 centipoise, which will generally improve the mobility ratio to a point that improved sweep efficiency can be achieved. It may be desirable to add a small concentration of the hydrophilic polymer to the surfactant solution, but it is generally satisfactory to follow the surfactant solution with a mobility buffer which comprises an aqueous solution of the hydrophilic polymer. This mobility buffer itself is then displaced through the formation by injecting water into the formation. Whether or not the mobility buffer solution is used, the final phase of the supplemental oil recovery operation will comprise injecting water into the formation to displace the surfactant solution and the displaced oil through the formation to the producing well. Water injection will be continued until the water-oil ratio at the producing well rises to about 30 to 40.

The invention can be more fully understood by reference to the following field example, which is offered only for purpose of illustration and is not intended to be limitative or restrictive of the invention, which will be defined more precisely hereinafter in the claims.

FIELD EXAMPLE

A subterranean, petroleum containing limestone formation is found at a depth of 5,000 feet. The limestone formation is 40 feet thick and the porosity is 30 percent. The field is exploited first by primary production, utilizing a square grid pattern with 400 feet line spacing between wells. At the conclusion of primary recovery, which recovers only 25 percent of the original petroleum in place within the reservoir, water injection wells are drilled in the center of each square grid to convert the field to an inverted five spot pattern for water injection. Although a large field entails a multiplicity of the square grid patterns, each 400 feet on a side and with an injection well in the center, it is possible to analyze the entire field by considering only a single grid unit. Water is injected into the injection well and production of oil is continued from the production wells until the water-oil ratio reaches 30, which is considered to the economic limit for continued production. At the conclusion of the water flooding operation, only 45 percent of the original oil in place in the reservoir has been recovered, and some other form of supplemental recovery operation must be resorted to in order to obtain any significant portion of the remaining petroleum.

The formation water is analyzed and found to contain 11,000 parts per million calcium and 3,000 parts per million magnesium. Capillary displacement tests are performed using actual formation water and it is determined that no single anionic or nonionic surfactant can be used in water containing 14,000 parts per million total hardness. It is determined, however, that a two component surfactant system can be used, and the maximum capillary displacement results from the use of 0.60 percent by weight of a sodium dodecyl polyethoxylated sulfate and 0.60 percent by weight ammonium laurylbenzene sulfonate. Since the formation is known to absorb both anionic surfactants, the first 10 percent of the surfactant slug will contain 2.0 percent by weight of each anionic surfactant, and the remainder of the slug will contain the above stated concentrations of each material.

Since the pattern used results in 70 percent sweep efficiency, the total pore volume swept by injected fluid is 400 Ft. × 400 Ft. × 40 Ft. × 0.30 × 0.70 = 1,344,000 Cu.Ft. A 10 percent pore volume surfactant slug or 134,000 cu. Ft. or 1,047,000 gallons is used. The first 10 percent of this slug, or 104,700 gallons contains 2 percent by weight of each anionic surfactant. The balance of the surfactant solution contains 0.60 percent by weight sodium dodecyl polyethoxylated sulfate and 0.60 percent by weight ammonium laurylbenzene sulfonate.

The surfactant solution is followed by injecting 1,000,000 gallons of an aqueous solution containing 300 parts per million of polyacrylamide, a hydrophilic polymer, to increase the viscosity of the injected aqueous fluid to about 11 centipoise. Finally, water is injected into the formation to displace the surfactant, thickened water solution, and the displaced oil through the formation toward the production wells. Water injection is continued until the water-oil ratio rises to about 30, at which point the residual oil saturation is reduced to 12 percent pore volume and approximately 85 percent of the original oil in place within the swept area is recovered.

EXPERIMENTAL

In order to establish the operability of this invention, and further to determine the optimum ratio of the essential constituents of the novel surfactant composition of our invention, the following experimental work was performed.

Simulated formation water was prepared to match as closely as possible the analysis of formation water from the Slaughter Field, Hockley County, Tex. which was under laboratory evaluation for possible application of the subject invention. The composition of the simulated formation water is given in Table I below.

TABLE I

SIMULATED LIMESTONE FORMATION
CONNATE WATER COMPOSITION

| | |
|---|---|
| $CaSO_4$ | 0.97 Grams Per Liter |
| $CaCl_2$ | 40.65 Grams per Liter |
| $MgCl_2 \cdot 6H_2O$ | 34.60 Grams per Liter |
| $NaHCO_3$ | 0.40 Grams Per Liter |
| NaCl | 161.90 Grams Per Liter |

Some precipitation of salts occurred, however, the water was saturated with divalent cations of the various salts used in formulated the formation water, and contained approximately 15,000 parts per million calcium and 4,500 parts per million magnesium ions. This synthetic connate water was used in varying dilutions in the first series of capillary displacement tests described below.

Capillary displacement tests provide a convenient and accurate method for confirming the suitability of the two component surfactant system used in the process of this invention. The tests are performed by filling a number of closed end capillary tubes with the particular crude oil being studied, and submerging the capillary tubes horizontally into the desired aqueous phase. In the instance of the subject series of tests, the aqueous phase comprised the indicated mixture of simulated connate water and fresh water plus the surfactant mixture being evaluated. In each instance of displacement of oil by the aqueous phase, a meniscus was formed at the oil-water interface. The only force tending to displace oil from the capillary tube was the force resulting from the difference in specific gravities of the two fluids. This force was offset by the interfacial tension between the oil and aqueous fluid, and it was observed that essentially no displacement occurred in the instance of formation water having no surfactant added thereto. When the surfactant composition was successful in producing a movement in the meniscus, the distance traveled by the meniscus, in millimeters, in a 5 minute exposure interval in the chemical system is recorded, and it is this displacement in millimeters that is given in FIGS. 1, 2, and 4–7 which will be described more fully hereinafter below. There was essentially no displacement of the meniscus in the instance of capillary tubes submerged in the formation water containing no surfactant of any kind, indicating that the interfacial tension between the crude oil and the formation water was too great to permit displacement of the oil from the capillary. The maximum reduction in interfacial tension is indicated by the maximum value of the displacement observed in the capillary tubes.

In FIG. 1 there is illustrated the results of a series of capillary displacement test using an aqueous solution containing 60 percent of the simulated formation water described above and 40 percent fresh water, resulting in 12,000 ppm total hardness plus from 0 to 0.5 percent of each surfactant, specifically sodium dodecyl polyethoxy sulfate and ammonium linear laurylbenzene sulfonate. It can be seen that the capillary displacement rises smoothly to a maximum value corresponding to 0.5 percent by weight of each material.

Figure 2:
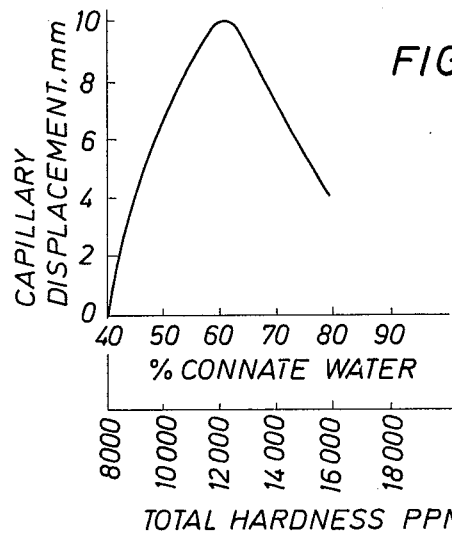
FIG. 2 illustrates the results of a series of capillary displacement tests utilizing an aqueous solution of the two surfactants with the total hardness varied from 8,000 to 18,000 parts per million.

FIG. 2 gives the results of a series of capillary displacement tests utilizing 0.5 by weight of each of the surfactants described above with the total hardness varied from 8,000 ppm to about 16,000 ppm. It can be seen that the mixture is effective from about 9,000 ppm to about 16,000 ppm with the optimum results occurring from about 11,000 to about 13,000 ppm. It is interesting that this mixture is ineffective below about 8,000 parts per million total hardness. Performance can be increased in the lower hardness range, e.g. 3,000 – 8,000 ppm, by using more of the alkylaryl sulfonate, then the alkyl polyethoxy sulfate, whereas performance in the 14,000–18,000 ppm hardness range can be increased by using greater quantities of the sulfate than the sulfonate.

Figure 3:
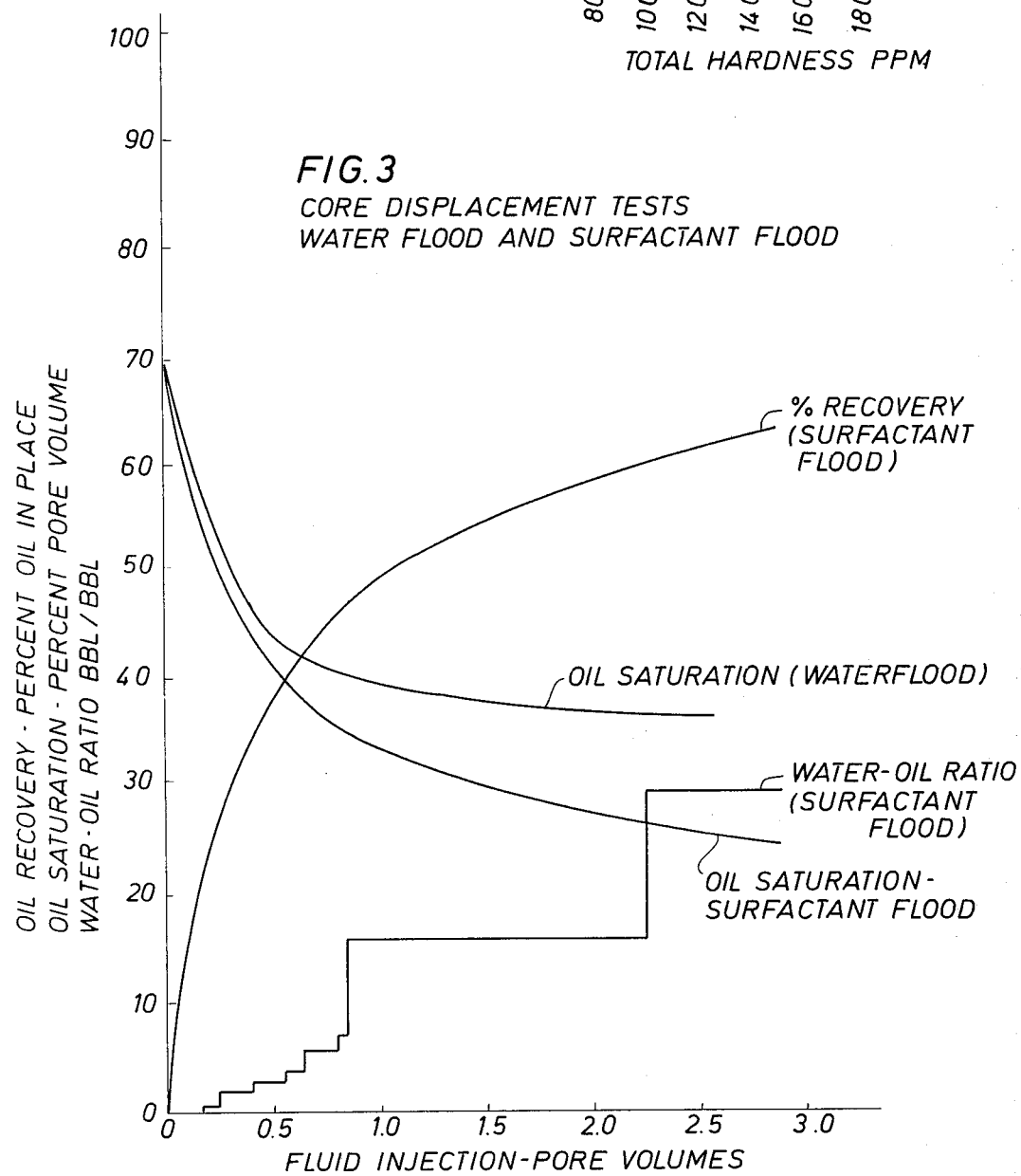
FIG. 3 gives the results of laboratory core displacement tests illustrating the percent oil recovery, oil saturation, and water-oil ratio for a conventional water flood and for the two component surfactant system flood of this invention.

FIG. 3 illustrates the results of a laboratory core displacement test using 0.5 percent of sodium dodecyl polyethoxy sulfate and 0.5 percent ammonium linear laurylbenzene sulfonate in a radial San Andres dolomite core which has been previously saturated with 32° A.P.I. gravity crude oil from the Slaughter Field. The surfactants were used in a mixture of 60% simulated Slaughter formation water plus 40 percent fresh water, resulting in a polyvalent ion concentration of 12,000 ppm.

Another series of tests were performed using simulated Cogdell Canyon Reef Formation water having the following composition:

TABLE II

SIMULATED COGDELL FORMATION WATER
COMPOSITION

| | |
|---|---|
| $MgCl_2 \cdot 6H_2O$ | 7.2 Gram/Liter |
| $NaHCO_3$ | .336 Gram/Liter |
| $NaSO_4$ | .985 Gram/Liter |
| $CaCl_2$ | 17.69 Gram/Liter |
| NaCl | 94.0 Gram/Liter |

This resulted in water having total hardness or total polyvalent ion concentration of 7,000 parts per million.

In FIG. 4, results are given for a series of capillary tests performed in the simulated formation water whose composition is given in Table II, and containing 0.4% sodium tridecyl polyethoxy sulfate, with varying concentration from 0 to 0.6 percent by weight of ammonium linear dodecylbenzene sulfonate. It can be seen that no capillary displacement resulted using 0.4 percent alkyl ethoxylated sulfate until at least 0.1 percent linear alkylaryl sulfonate was present, and the maximum displacemnt resulted from the use of 0.4 percent sulfonate.

In FIG. 5 there is illustrated the results of a series of capillary displacement tests using the same 7,000 ppm total hardness water plus 0.4 percent ammonium dodecylbenzene sulfonate plus from 0 to 0.6 percent sodium tridecyl polyethoxylated sulfate. It will be appreciated that no capillary displacement occurred until at least 0.1% alkyl polyethoxy sulfate was present, and the optimum displacement occurred at 0.4 percent sulfate. Satisfactory displacement occurred using from 0.15 to about 0.6 percent alkyl polyethoxylated sulfate.

Taking the results depicted in FIGS. 4 and 5 together it will be understood that neither material is effective in this hard water environment alone, but a synergistic interaction results when both materials are used together within the critical ranges discussed above.

In FIG. 6 there is given the results of a series of capillary displacemtnt tests using varying concentrations of the two materials. In each test the same concentrations of each material are used and it can be seen that the maximum displacement results from the use of at least 0.4 percent linear alkylaryl sulfonate and at least 0.4 percent alkyl polyethoxylated sulfate.

FIG. 7 illustrates the capillary displacement response to variations in total polyvalent ion concentration from 4,900 to 7,000 ppm. It can be seen that the maximum displacement occurs at a total polyvalent ion concentration (total hardness) of 6,200 ppm, and satisfactory results for this surfactant level occur from 5,000 – 7,000 ppm polyvalent ions.

Corresponding capillary displacement tests similar to those described above in the same aqueous environment using only petroleum sulfonate for the surfactant could not be performed because of the immediate precipitation of petroleum sulfonate on contacting the aqueous solutions containing the high concentrations of calcium and magnesium that are involved in these tests.

Thus, we have disclosed and demonstrated in laboratory experiments that the use of an aqueous solution containing from 0.05 to 5.0 percent by weight of a water solubile salt of a linear alkylaryl sulfonate plus from 0.05 to about 5.0 percent of an alkyl polyethoxylated sulfate will effectively function as a surfactant in aqueous solution to reduce the interfacial tension between crude oil and water in the presence of hard water, e.g., water having from about 3,000 to 18,000 parts per million total hardness (calcium plus magnesium). While test results of only one particular alkylaryl sulfonate anionic surfactant and only two water soluble salts of an alkyl polyethoxylated sulfate have been disclosed, many other such materials will be apparent to those skilled in the art of surfactant flooding oil recovery, and it is intended that the true spirit and scope of this invention be determined only by the claims which are appended hereinafter below.

We claim:

1. In a method for recovering petroleum from a subterranean, petroliferous, porous formation, penetrated by at least one injection well and at least one production well, said formation containing water having polyvalent ions including calcium and magnesium dissolved therein in a concentration of from about 3,000 to about 18,000 parts per million, said recovery method being of the type wherein an aqueous fluid is injected into the formation via the injection well, and oil displaced by the injected fluid is recovered from the formation via the production well, wherein the improvement comprises injecting into the formation an aqueous surfactant solution comprising:
   a. a first anionic surfactant selected from the group consisting of alkyl sulfonates containing from 5 to 25 carbon atoms and alkylaryl sulfonates wherein said alkyl constituent contains from 5 to 25 carbon atoms, and
   b. a second anionic surfactant comprising a water soluble salt of an alkyl polyethoxy sulfate containing from 1 to 10 ethoxy groups, said alkyl constituent containing from 7 to 20 carbon atoms.

2. A method as recited in claim 1 wherein a cation is associated with the first anionic surfactant, said cation being independently selected from the group consisting of sodium, potassium and ammonium.

3. A method as recited in claim 2 wherein the cation is ammonium.

4. A method as recited in claim 2 wherein the cation is sodium.

5. A method as recited in claim 1 wherein said second anionic surfactant is associated with a cation selected from the group consisting of ammonium, potassium and sodium.

6. A method as recited in claim 5 wherein said cation is sodium.

7. A method as recited in claim 5 wherein said cation is ammonium.

8. A method as recited in claim 1 wherein the alkyl chain of the first anionic surfactant contains from 8 to 14 carbon atoms.

9. A method as recited in claim 1 wherein the alkyl chain of the second anionic surfactant contains from 8 to 14 carbon atoms.

10. A method as recited in claim 1 wherein the first anionic surfactant is the ammonium salt of linear dodecylbenzene surfonate.

11. A method as recited in claim 1 wherein the first anionic surfactant is the ammonium salt of linear laurylbenzene sulfonate.

12. A method as recited in claim 1 wherein the second anionic surfactant is sodium dodecyl polyethoxy sulfate.

13. A method as recited in claim 1 wherein the second anionic surfactant is sodium tridecyl polyethoxy sulfate.

14. A method as recited in claim 1 wherein the concentration of the first anionic surfactant in the surfactant solution is from about 0.05 to 5.0 percent by weight.

15. A method as recited in claim 1 wherein the concentration of the first anionic surfactant is from about 0.20 to about 0.50 percent by weight.

16. A method as recited in claim 1 wherein the concentration of the second anionic surfactant is from about 0.05 to about 5.0 percent by weight.

17. A method as recited in claim 1 wherein the concentration of the second anionic surfactant is from about 0.2 to 0.5 percent by weight.

18. A method as recited in claim 1 wherein the ratio of first anionic surfactant concentration to the nonionic surfactant concentration is from about 1 to 4 to about 4 to 1.

19. A method as recited in claim 1 wherein the aqueous surfactant solution also has dissolved therein a hydrophilic polymer selected from the group consisting of polyacrylamide and polysaccharide in sufficient concentration to increase the viscosity of the aqueous surfactant solution.

20. A method as recited in claim 1 wherein the aqueous surfactant solution is followed by the injection of an aqueous solution having dissolved therein sufficient hydrophilic polymer selected from the group consisting of polyacrylamide and polysaccharide to increase the viscosity.

21. A method as recited in claim 1 wherein the concentration of at least one of the surfactants is greater in the first portion of surfactant solution injected into the formation than in the latter portion.

22. A method as recited in claim 1 wherein an aqueous solution of a sacrificial inorganic material is injected into the formation in advance of the surfactant solution to minimize adsorption of surfactant onto the formation surfaces.

* * * * *